United States Patent
Goldschneider

(10) Patent No.: US 11,615,431 B2
(45) Date of Patent: Mar. 28, 2023

(54) REAL TIME ENERGY CONSUMPTION MANAGEMENT OF APPLIANCES, DEVICES, AND EQUIPMENT USED IN HIGH-TOUCH AND ON-DEMAND SERVICES AND OPERATIONS

(71) Applicant: GridPoint, Inc., Reston, VA (US)

(72) Inventor: Jill R. Goldschneider, Seattle, WA (US)

(73) Assignee: GridPoint, Inc., Reston, VA (US)

( * ) Notice: Subject to any disclaimer, the term of this patent is extended or adjusted under 35 U.S.C. 154(b) by 0 days.

(21) Appl. No.: 16/821,179

(22) Filed: Mar. 17, 2020

(65) Prior Publication Data
US 2021/0042769 A1 Feb. 11, 2021

Related U.S. Application Data

(63) Continuation of application No. 14/057,561, filed on Oct. 18, 2013, now abandoned.

(51) Int. Cl.
G06Q 30/02 (2012.01)
G06Q 30/0202 (2023.01)
G06Q 50/06 (2012.01)

(52) U.S. Cl.
CPC ......... *G06Q 30/0202* (2013.01); *G06Q 50/06* (2013.01)

(58) Field of Classification Search
CPC combination set(s) only.
See application file for complete search history.

(56) References Cited

U.S. PATENT DOCUMENTS

| | | | |
|---|---|---|---|
| 2010/0167659 A1* | 7/2010 | Wagner | G08C 19/02 455/343.1 |
| 2011/0061014 A1* | 3/2011 | Frader-Thompson | G01D 4/002 715/771 |

(Continued)

OTHER PUBLICATIONS

Alan D. Hutson, A Semi-Parametric Quantile Function Estimator for Use in Bootstrap Estimation Procedures, Statistics and Computing, Oct. 2002, vol. 12, Issue 4, pp. 331-338 (Year: 2002).*

(Continued)

*Primary Examiner* — Arif Ullah
(74) *Attorney, Agent, or Firm* — Bookoff McAndrews, PLLC

(57) ABSTRACT

An embodiment models and predicts energy consumption and provides recurring and realistic opportunities to reduce energy consumption throughout the work day or process cycle using user interfaces to convey positive and negative feedback in a controlled manner; and user experience, that reward positive changes with increased positive feedback and reduced negative feedback. Energy consumption of categories of appliances, devices, and equipment is considered a random variable. Using archived energy data, business data, and other related data, statistical modeling is used to create inverse cumulative probability distribution functions. An energy budget (consumption prediction) is computed so that it meets a probability p of the budget being exceeded during a given interval. When the budget is exceeded the feedback is negative, otherwise feedback is positive. Each budget is computed as the value b of the random variable such that the probability that the random variable will be less than or equal to b is 1-p.

20 Claims, 11 Drawing Sheets

(56) References Cited

U.S. PATENT DOCUMENTS

2012/0101653 A1\* 4/2012 Tran .................. G01D 4/004
  700/296
2012/0169511 A1\* 7/2012 Windstrup ............. B60L 53/64
  340/870.02
2013/0085614 A1\* 4/2013 Wenzel ................ G05B 13/021
  700/277

OTHER PUBLICATIONS

Alan D. Hutson, A Semi-Parametric Quantile Function Estimator for Use in Bootstrap Estimation Procedures, Statistics and Computing, Oct. 2002, vol. 12, Issue 4, pp. 331-338.

\* cited by examiner

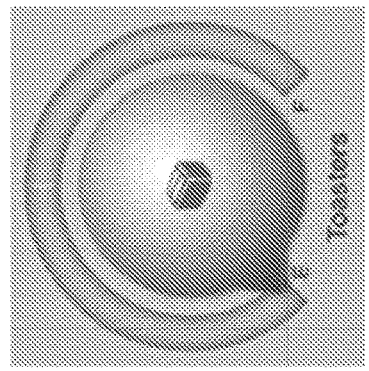
Green Overlay
601a
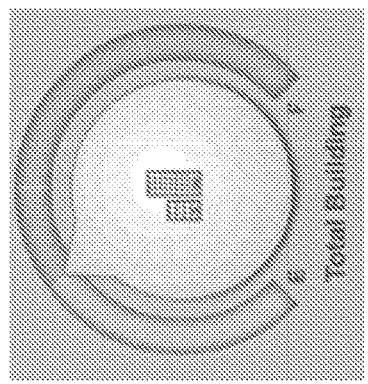
Yellow Overlay
601b
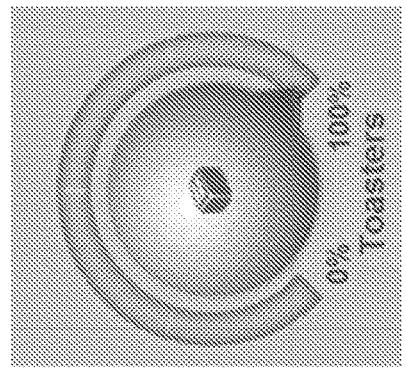
Red Overlay
601c
Near Real Time Visualization of a Budget using a Fuel Gauge Depletion Paradigm
601
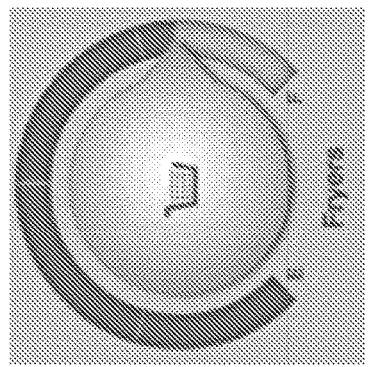
Green Overlay
602a
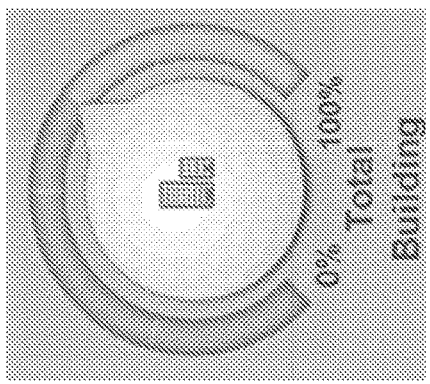
Yellow Overlay
602b
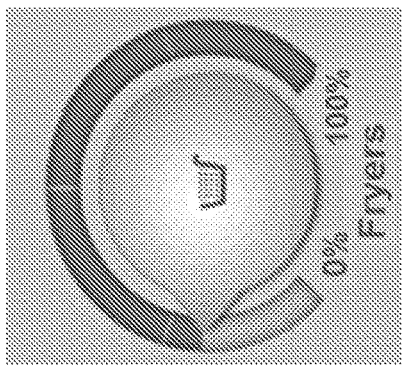
Red Overlay
602c
Near Real Time Visualization of a Budget using a Gauge Accumulation Paradigm
602
FIG. 6

Three Categories and Four End States

| p | Green | Yellow | Orange | Red |
|---|---|---|---|---|
| 0.5 | 12.5% | 37.5% | 37.5% | 12.5% |
| 0.45 | 16.6% | 40.8% | 33.4% | 9.1% |
| 0.4 | 21.6% | 43.2% | 28.8% | 6.4% |
| 0.35 | 27.5% | 44.4% | 23.9% | 4.3% |
| 0.3 | 34.3% | 44.1% | 18.9% | 2.7% |
| 0.25 | 42.2% | 42.2% | 14.1% | 1.6% |
| 0.2 | 51.2% | 38.4% | 9.6% | 0.8% |
| 0.15 | 61.4% | 32.5% | 5.7% | 0.3% |
| 0.1 | 72.9% | 24.3% | 2.7% | 0.1% |
| 0.05 | 85.7% | 13.5% | 0.7% | 0.01% |
| 0 | 100% | 0% | 0% | 0% |

901

Three Categories and Three End States

| p | Green | Yellow | Red |
|---|---|---|---|
| 0.5 | 12.5% | 75% | 12.5% |
| 0.45 | 16.6% | 74.3% | 9.1% |
| 0.4 | 21.6% | 72.0% | 6.4% |
| 0.35 | 27.5% | 68.3% | 4.3% |
| 0.3 | 34.3% | 63.0% | 2.7% |
| 0.25 | 42.2% | 56.3% | 1.6% |
| 0.2 | 51.2% | 48.0% | 0.8% |
| 0.15 | 61.4% | 38.3% | 0.3% |
| 0.1 | 72.9% | 27.0% | 0.1% |
| 0.05 | 85.7% | 14.3% | 0.01% |
| 0 | 100% | 0% | 0% |

| State | Color | Value |
|---|---|---|
| S1 | C1 | V1 |
| S2 | C2 | V2 |
| ... | ... | ... |
| SN | CN | VN |

1002

| State | Color | Value |
|---|---|---|
| S1 | C1 | 3 |
| S2 | C2 | 2 |
| S3 | C3 | 1 |
| S4 | C4 | 0 |

1001

| Bin | Ratio R | Award Level |
|---|---|---|
| Bin 0 | $0 \leq R < T1$ | L0 |
| Bin 1 | $T1 \leq R < T2$ | L1 |
| ... | ... | ... |
| Bin M | $TM \leq R \leq 1$ | LM |

1004 Past Six Hours

| | H-6 | H-5 | H-4 | H-3 | H-2 | H-1 |
|---|---|---|---|---|---|---|
| State | S1 | S2 | S3 | S4 | S1 | S2 |
| Color | C1 | C2 | C3 | C4 | C1 | C2 |
| Value | 3 | 2 | 1 | 0 | 3 | 2 |

1005

| Sum | Max | Ratio | Award Level |
|---|---|---|---|
| 11 | 18 | 11/18 = 0.61 | L4 |

1003

| Bin | Ratio R | Award Level |
|---|---|---|
| Bin 0 | $0 \leq R < 0.125$ | L0 |
| Bin 1 | $0.125 \leq R < 0.25$ | L1 |
| Bin 2 | $0.25 \leq R < 0.375$ | L2 |
| Bin 3 | $0.375 \leq R < 0.5$ | L3 |
| Bin 4 | $0.5 \leq R < 0.625$ | L4 |
| Bin 5 | $0.625 \leq R < 0.75$ | L5 |
| Bin 6 | $0.75 \leq R < 0.875$ | L6 |
| Bin 7 | $0.875 \leq R \leq 1$ | L7 |

FIG. 10

REAL TIME ENERGY CONSUMPTION MANAGEMENT OF APPLIANCES, DEVICES, AND EQUIPMENT USED IN HIGH-TOUCH AND ON-DEMAND SERVICES AND OPERATIONS

CROSS-REFERENCE TO RELATED APPLICATION(S)

This patent application is a continuation of and claims the benefit of priority to U.S. application Ser. No. 14/057,561, filed on Oct. 18, 2013, the entirety of which is incorporated herein by reference.

BACKGROUND OF THE INVENTION

1. Field of the Invention

The invention relates generally to systems and methods for creating and implementing near real-time user interfaces (dashboards, alerts, reports, and visual and audio cues) for the management of appliances, devices, and other equipment used in high-touch and on-demand services and operations in order to reduce energy consumption while simultaneously meeting business goals. More specifically, the invention relates to how energy use patterns of appliances, devices and other equipment are collected, analyzed and modeled, and how to provide to service and operative workers real time feedback in a systematic and controlled manner to positively affect the energy use of appliances, devices, and other equipment used in their line of business while simultaneously meeting business goals.

2. Description of the Related Art

An energy management system (EMS) is used to instrument (collect data), monitor, and report on power consuming devices, appliances, and equipment as well as events and status conditions. Examples of power consuming devices, appliances, and equipment include refrigeration units, ovens, toasters, cash registers, sewing machines, air compressors, conveyors, kilns, dryers, extruders, LCD displays, lighting panels, HVAC units, sensors, meters, controllers, and switches. Examples of events and status conditions include door open, door closed, trash compactor full, and trash compactor away. EMS data may be supplemented with quantitative data including environmental and climate data such as temperature, cloud cover, sun rise and set, and relative humidity; non-energy utility use such as water, sewage, and telecommunications; performance data such as uptime, runtime or throughput; and business data such as purchases, orders, packaging, and routing. In some cases, an EMS is also used to control devices and appliances. For example, an HVAC may be controlled using real-time temperature and humidity readings to achieve desired comfort levels, and parking lights may be controlled by business hours and local times of sun rise and sun set.

The EMS data are relayed to a data store or data center that can be local to the collection device, building, business, or remotely hosted or distributed in the cloud. The data are typically accessed by a data processing and reporting system and presented to a user who oversees facilities. The user would access the presented data using a computer device such as a computer monitor, tablet, or smart phone using an interface such as email, document viewer, web browser client, or other hosted application that communicates to a backend server and data store where the backend server may be locally or remotely hosted and managed.

The facilities manager can look at total building energy use trends, drill down to specific devices or appliances, examine or identify certain unusual conditions that may be manually or automatically detected, such as a malfunctioning HVAC unit, too low or too high room temperatures, or an oven left on when the building is unoccupied. A facilities manager can then take actions to mitigate problems or prioritize retrofits and upgrades based on energy use patterns of the various devices, appliances, and equipment.

The facilities manager uses the EMS as both a strategic and tactical tool. Interactions with the EMS may be sporadic or at regular intervals such as daily, weekly, monthly, or quarterly depending on the facilities manager's responsibilities and priorities. However, employees working in high-touch and on-demand services and operations and whose work involves the regular use of multiple devices, appliances, and other equipment are not able to use the EMS as part of their daily workflow for the benefit of the business or activity in which they are involved.

In service and manufacturing-based industries, there are often highly variable or erratic service and manufacturing requests that arrive throughout the business day. EMS controls are usually not employed in these lines of business, leaving operative and service workers, such as food preparation and cooking machine operators, furnace, kiln, and dryer operators, and first line managers in charge of managing the devices, appliances, and equipment of their trade on an ad hoc basis. Without feedback as to the amount of energy used as a function of the business activity, these workers have little guidance or incentive to make changes to their workflow behavior that would reduce energy use.

To better manage the energy use of appliances, devices, and other equipment, operative workers require real-time information that is relayed with minimal detail, that is easy to see and consume, and that does not distract them from their task at hand. What information is needed and how it is conveyed will depend on the work environment. Information may need to be relayed in visual and/or audio forms. The level of details and types of information may need to be a simple cue, prompt, or instruction for "in-the-moment" feedback; simple summaries of energy use successes or issues by shift or other period of time may need to be available to line managers and operative workers to evaluate during and after a shift or other period of time; scoreboards showing information for multiple teams at one or at various business locations may be needed to drive competitive behaviors; and richly detailed reports of energy use trends and patterns at various levels of the organization to enable better understanding of the business and enable process improvements for reducing their carbon footprint.

To make beneficial changes in their behavior, service employees need a reasonable and manageable amount of in-the-moment feedback that doesn't overwhelm them or discourage them from making or continuing to make changes in their work flow that will lead to energy savings while simultaneously meeting business goals. It is important to incent positive changes made by a worker with positive feedback and a reduction in negative feedback. Therefore, there need to be methods and tools to define and control the level or rate of feedback given to operative employees to prevent the "user fatigue" or "backlash" that could result from too high a rate of in-the-moment feedback as well as methods to demonstrate and reward workflow changes that lead to energy savings.

The levels, or rates, of feedback may need to vary by any number of factors including appliance, device, equipment, industry, location, business unit, team, day of week, time of day, season, weather, orders, customer, and more. Since energy use fluctuates over time, there is inherent variability and unpredictability in the tasks an operator may do at any given time. As the goal is to drive improvements in energy use, robust statistical modeling and machine learning techniques that can learn and adapt over time to changing circumstances will be needed.

Furthermore, shift and line managers and executives will need to see reports of the performance by shift, day, or other periods of time that include longitudinal analysis to assess energy savings improvements over time.

SUMMARY

Various embodiments of the invention solve the above-mentioned problems by providing an energy management system that submeters in near real-time the appliances, devices, and equipment used by service and operative workers. The appliances, devices, and equipment are organized into categories of which all categories or a subset of categories may be used. To ensure that the near real-time feedback and recent summaries of energy use are relevant to the work at hand and that there are recurring and realistic opportunities for workers to reduce energy consumption throughout the work day or process cycle, discrete and independent time intervals (such as 1 hour) are used in which the amount of feedback of under and over use may be globally or independently set and managed for each category and interval of time. An energy budget for each category and for each time interval is provided where the budget is defined so that it meets a specified probability p of the budget being exceeded (alternatively, the probability of the budget being met is 1-p) during that time interval. When the budget is exceeded the feedback is said to be negative, and when the budget is met the feedback is said to be positive.

One method of providing energy budgets considers energy use for each category and interval pair a random variable. Using archived energy demand and consumption data, business data, and other related data, statistical modeling is used to create inverse cumulative probability distribution functions for each random variable. Each budget can be computed as the value b of the random variable such that the probability that the random variable will be less than or equal to b is 1-p. The underlying statistical models may be updated continuously as the volume of archived data expands over time. Other methods for providing energy budgets may use machine learning or other statistical techniques to predict or compute the budget that would be or should be used.

Once the budgets are available, various user interfaces (seen, heard, or otherwise perceived) can be used to convey: near real-time feedback about the under and over use of energy by category and interval so that service and operative workers may make in-the-moment changes in their workflow to reduce energy consumption; summary data regarding energy consumption of categories for recent time intervals so that operative workers and managers may understand short term performance or impact within a shift or process cycle; a user experience that rewards and incents sustained energy savings behaviors; and richly detailed, historical reports by category or at the appliance, device, and equipment levels over various windows of time to help the business better manage delivery and operations.

BRIEF DESCRIPTION OF THE DRAWINGS

These and other features, aspects, and advantages of the presently disclosed systems and methods will become better understood with reference to the following description and appended claims, and accompanying drawings where:

FIG. 6 contains screen shots illustrating various near real-time user interface visualizations of energy consumption under and over use.

FIG. 9 contains tables that would be used to assist the operator in configuring visualizations of summaries of energy consumption for recent time intervals.

FIG. 10 contains tables illustrating a method for a user experience and a concrete example of the method for rewarding and incenting sustained energy savings behaviors.

Figure 1:
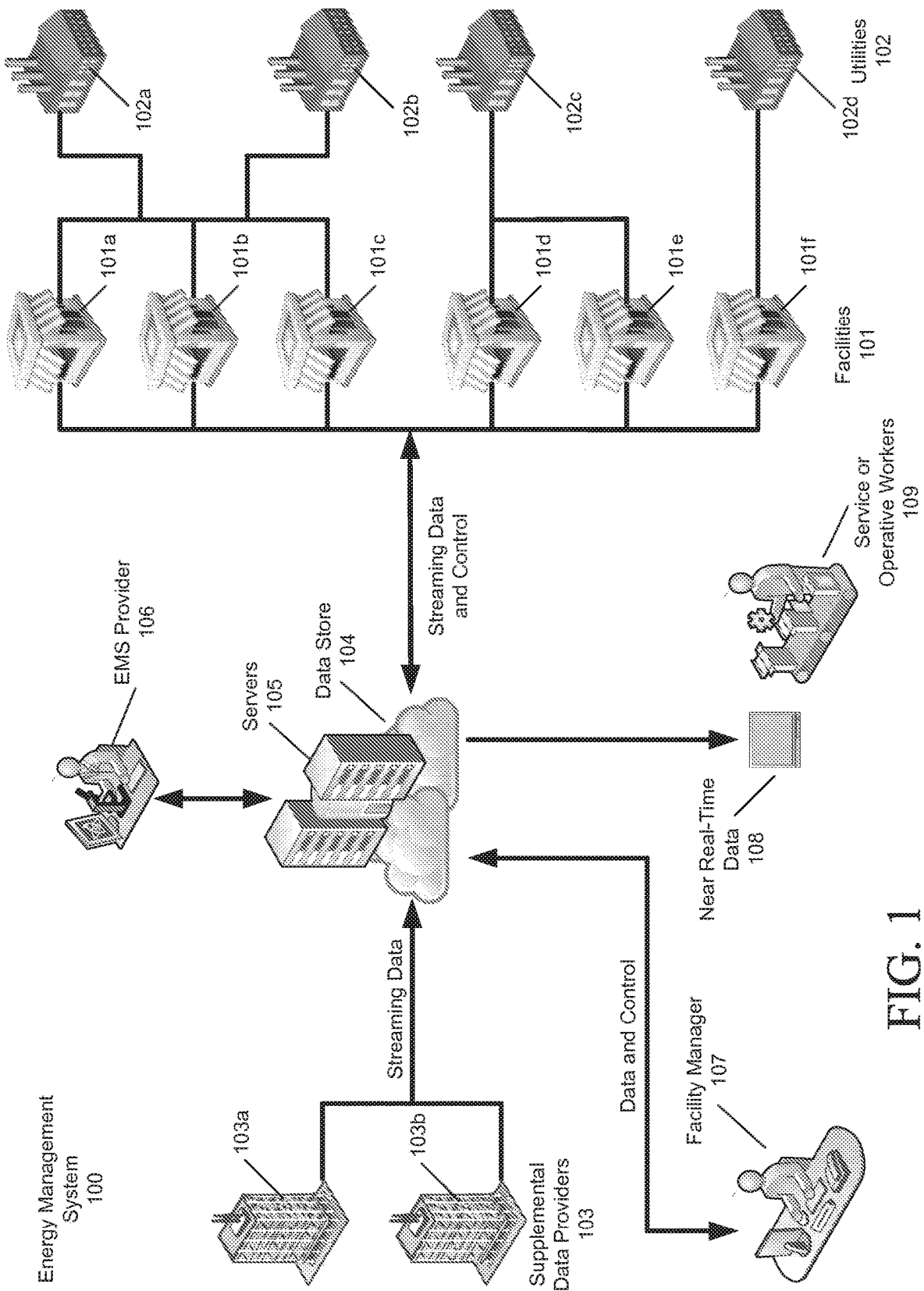
FIG. 1 is a block diagram illustrating an EMS that is using data from multiple facilities as well as supplemental data for the monitoring and control of the facilities and for providing near real-time feedback.

Some figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be standalone programs, may be incorporated as subroutines in an operating system, may be functions in an installed software package, and may reside in collocated or remotely located servers. It should be understood that the various embodiments are not limited to the arrangements and instrumentalities shown in the drawings.

DETAILED DESCRIPTION OF THE INVENTION

The present invention may be understood more readily by reference to the following detailed description of preferred embodiments of the invention as well as to the examples included therein. Embodiments of the invention provide systems and methods for the modeling of energy use patterns and for the creation and conveyance of near real-time feedback in a systematic and controlled manner for in-the-moment energy consumption management of appliances, devices, and equipment used in high-touch and on-demand services and operations.

FIG. 1 is an illustration of an energy management system (EMS) 100 for monitoring and controlling one or more facilities 101 which may be located in different geographic areas, and may receive energy in one or more forms, for example electricity and natural gas, and from one or more utilities. Utilities 102 use meters, typically at the utility side of the interconnection point, to monitor energy consumption and demand, while the EMS 100 uses different meters to monitor energy consumption and demand, typically at the facility side of the interconnection point. The EMS solution may also include sub-metering within a facility; the collection of other, non-energy specific, data within a facility; and supplemental data from third party data providers 103. Data streams are transmitted to a data store 104 and are processed into consumable forms of data by backend, possibly distributed, servers 105 as designed and directed by the EMS provider 106. An EMS user and operator, such as a facilities manager 107 accesses the prepared data using an interface such as email, document viewer, web browser client, or other hosted or native application. The operator can take responsive or corrective action based on the remotely received data provided by the remote servers 104. A near real-time user interface 108 provides feedback to service or operative workers 109 so that they can take immediate responsive or corrective action to better manage energy use of the appliances, devices and equipment used in their work flow. The EMS provider 106 also has access to the EMS 100 for the purpose of providing support, maintenance, and additional services.

Figure 2:
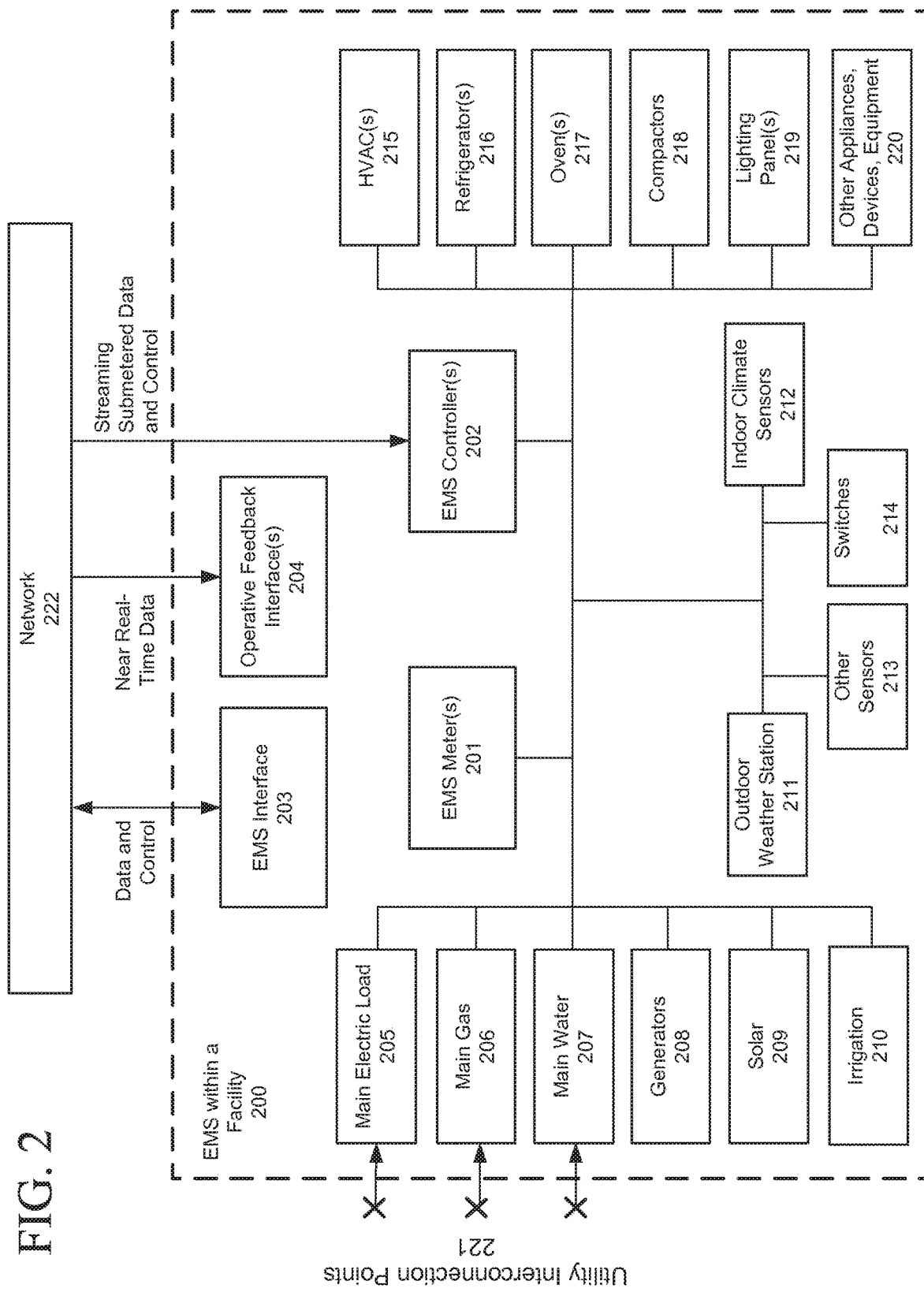
FIG. 2 is a block diagram illustrating a portion of an EMS submetering and control and real-time feedback solution within a single facility or site.

In an embodiment, each facility has submetering and possibly control and user interface hardware installed in it that is part of the energy management system and separate from utility-installed meters. FIG. 2 is an illustration of the portion of an EMS that may be found within a single facility 200. A facility may be equipped with one or more meters 201 and one or more controllers 202. A facility may be equipped with an interface 203 for monitoring and control of the facility and with near real-time user interfaces 204 for appliances, devices and equipment used by businesses within the facility. Typical measured data include, but are not limited to: total electric 205, gas 206, and water 207 utility use; natural gas or solar 208 and 209 power generation; facilities operations such as irrigation 210, submetered utility use such as HVAC, refrigeration, ovens and other appliances, devices and equipment 215-220; and status, events, and environmental data, 211-214. The submetering equipment may include or interface with other devices and sensors to collect status, events, and environment data such as indoor and outdoor climate data, $CO_2$, and door open/closed. Total utility use metering 205-207 may be reconciled against metering done by the utility on its side of the interconnection point 221. Supplemental data (not shown in FIG. 2) may also be collected and sent to the energy management system to be stored and processed in support of specific EMS applications such as outdoor equipment control, weather normalized energy modeling, bill and rate verification, or order normalized energy modeling.

Figure 3:
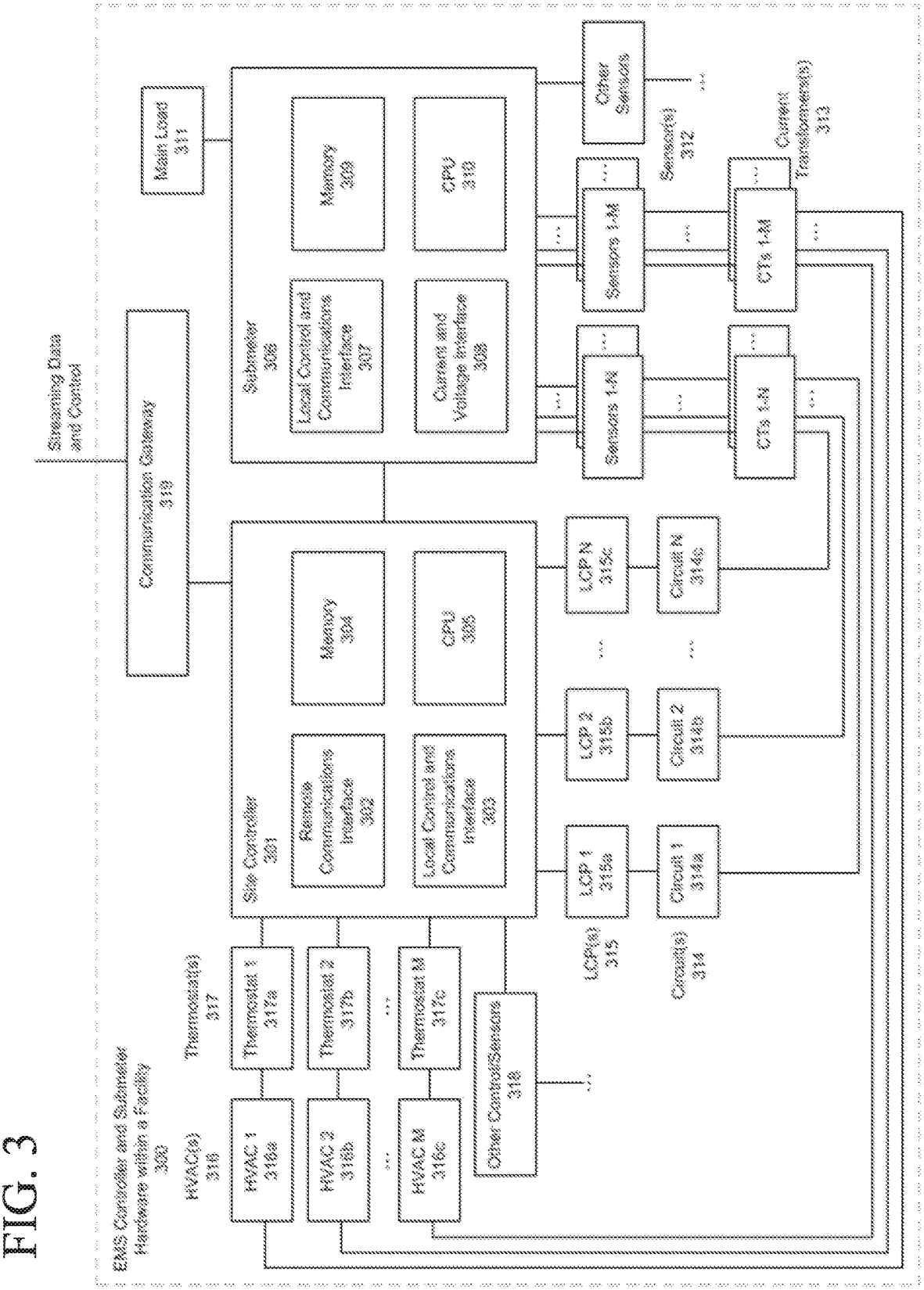
FIG. 3 is a block diagram illustrating a simplified configuration of controller and submetering hardware in a facility.

FIG. 3 is detailed schematic block diagram illustrating typical energy management system control and submetering hardware installed at a facility 300. A site controller 301 with embedded control algorithms controls electrical loads on multiple circuits 314 via light control panels (LCPs) 315.

The site controller 301 is typically wired to common voltages at an electrical distribution panel (not shown) of a building facility via a main line meter (power submeter) 306. The site controller 301 includes memory 304 and CPU 305 for respectively storing and implementing energy management algorithms. The algorithms accept real-time power and environmental variable measurements (such as readings from thermostats 317) as inputs and determine how to control the power delivered on various circuits 314 and to control set points and other configurable settings such as enabling/disabling compressor stages on the thermostats 317. The site controller 301 may include a power supply (not shown) and one or more wired or wireless local communication and control interfaces 303 for controlling the circuits 314 and thermostats 317. The thermostats 317 provide temperature and humidity inputs to the site controller 301, and output control signals to the HVAC units 316. A communication interface 302 provides bi-directional communication with a communication gateway 319, which in turn manages wired or wireless communications from the EMS server.

In an embodiment, one or more submeters 306 are coupled to the site controller 301 either via wired or wireless connection. The submeter 306 includes hardware and firmware to provide sampling functionality, including multiple analog-to-digital converters for multi-channel fast waveform sampling of inputs such as current and voltage to produce a suite of measurements including demand, consumption, reactive power, power factor, and voltage. The submeter 306 includes wired or wireless communication interfaces 307, current and voltage monitoring interfaces 308, memory 309, CPU 310, and may also include a power supply (not shown). The current and voltage monitoring interfaces connect between the power circuits being monitored and the A/D converter. Each channel may be connected to a separate power circuit to monitor the flow of current through the circuit. The connection is typically made with a current transformer 313 at both a supply (i.e., hot) line and a return (i.e., neutral) line of the power circuit, which provides a waveform signal that is representative of the current flow at the connection point. The submeter 306 can receive voltage and current measurements from the main line 311 as well as measurements from any of a number of devices 312 or groups of devices, as illustrated in FIG. 2 and described herein. The controller 301 can also receive data directly from other sensors 318. Sampled data flows from the submetering devices 306 through the controllers 301 and on to the remote EMS servers via a wired or wireless network.

The submetering and control equipment can collect near real-time measurements (for example, every 1, 5, or 15 minutes, and preferably 1 minute for this invention if used in a rapidly changing service environment such as a quick service restaurant). Each measurement has a time stamp, unit of measurement, and unique source identifier associated with it. Data from the same unique source comprise a time series which is univariate if only one unit of measure is recorded or multivariate if multiple units of measure are sampled. Preferably, sampling intervals are constant so that the time variable is implicit. Event data such as door open and door close may be irregularly spaced so that the time variable must be explicit. The data collected by the submetering equipment is sent to the energy management system via a wired or wireless network to be stored and processed.

Figure 4:
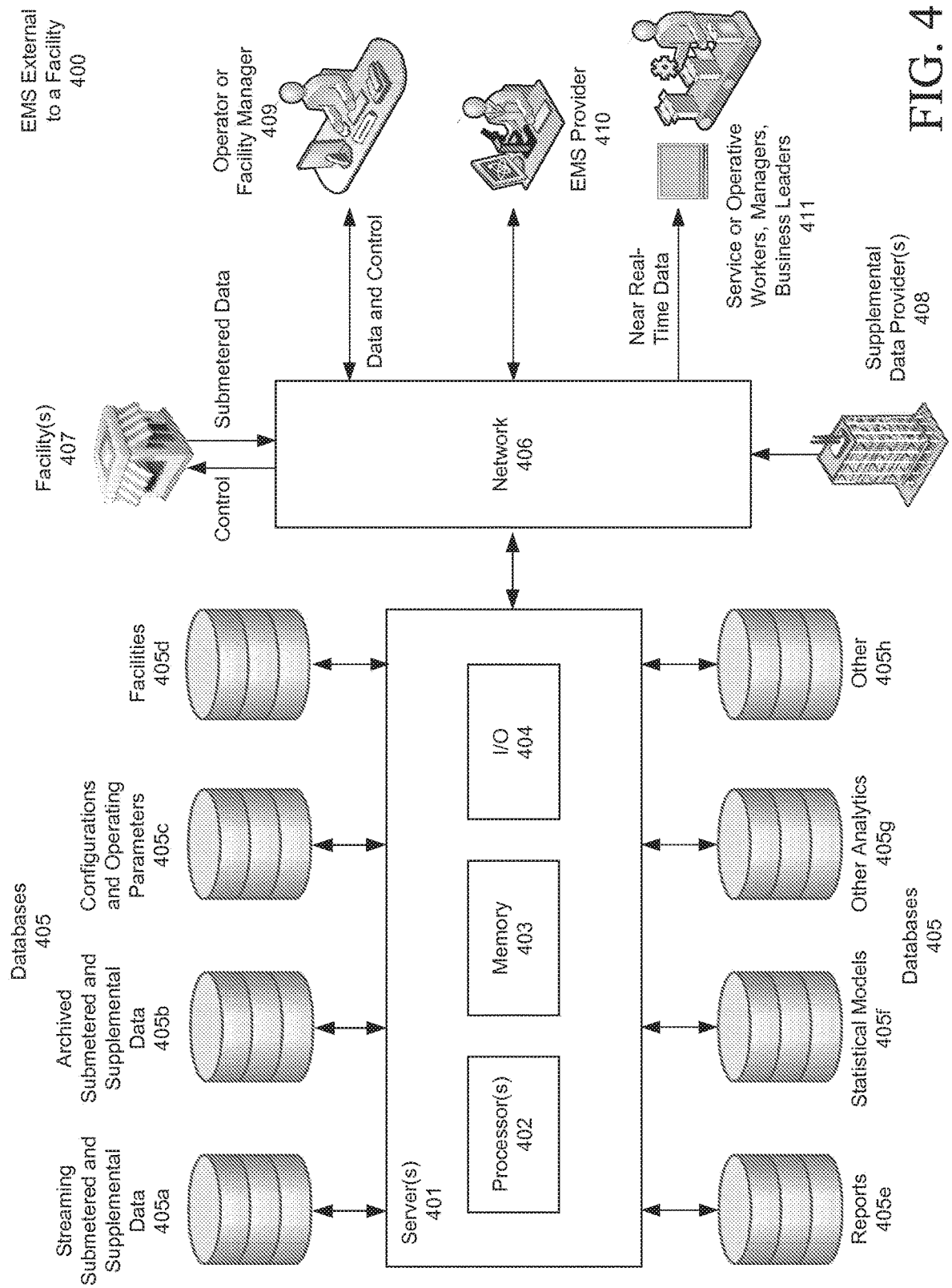
FIG. 4 is a block diagram illustrating a server system providing remote access for data and control and near real-time data to an EMS provider, facilities manager, service or operative worker, and business managers and business leaders.

FIG. 4 is an illustration of a portion of an EMS system external to a facility 400 with emphasis on server 401 and storage 405 systems used to provide remote data access and control to users including EMS providers, facility managers, operators, service or operative workers, managers, and business leaders.

The servers 401 include processors 402, memory 403, and one or more I/O interfaces 404 for receiving data, transmitting control and supporting end-user applications over a network 406 where end-user applications include facility management or other end-user application access and configuration 409. EMS service administration 410, and near real-time data for in-the-moment management of appliances, devices, and equipment used in a particular line of business 411.

Storage abstractions 405 include one or more databases, including a streaming data database 405a to store fresh data from the facilities 407 and supplemental providers 408, a historic database 405b to store archived data from the facilities 407 and supplemental providers 408, a configuration and operating parameters database 405c to store data required to run the EMS and end-user applications, a facilities database 405d to store data specific to each facility such as installation configuration and assets and points of contact, a reports database 405e to store static prepared data used in end-user applications, a statistical models database 405f to store predictive models used in end-user applications such as weather-normalized energy use prediction and near real-time data for in-the-moment management of appliances, devices, and other equipment used in high-touch and on-demand services and operations, a database for other analytics 405g such as alarms, and storage of other data 405h.

The memory 404 stores software (tangible data and programs) for creating, editing, and executing data and instructions necessary to operate the EMS and run end-user applications including creation of data structures, statistical models, reports and other data required to provide near real-time data for in-the-moment management of appliances, devices, and other equipment used in high-touch and on-demand services and operations.

A business manager or operator 409 can access the user application and configuration software and detailed reporting software remotely or directly if the software is installed at the user-operated control center. In an embodiment, the system is configured such that the operator is able to configure near-real time user interfaces for a single or multiple facilities and business applications.

The measured time series data are typically conceptualized and organized functionally. Business logic is applied to the time series to create logical, hierarchical, nested or other forms of structured data that support EMS applications including monitoring, reporting, near real-time control, and facilities maintenance. User interfaces to the EMS may be implemented and conceptualized at a variety of levels including asset, appliance, device, and other equipment, or as groups or cross-groups of assets, appliances, devices, and other equipment. The software must be flexible to support the wide variety of configurations that arise in the installation of submetering and control hardware at a facility. For example, if a facility has a single circuit dedicated to ovens, submetering be done on the circuit only to save costs; however, if there are additional ovens on different circuits, those ovens may have been separately submetered. The software must accommodate these variations when organizing the data.

To streamline and minimize the amount of feedback given to operational workers, the time series data for the appliances, devices, and equipment operated by them are organized into categories of which all categories or a subset of categories may be used. If a subset of categories is to be used, the business manager or operator may, in an embodiment, manually select in the software the categories to be used or select configurations in the software so that the software will automatically select or recommend which categories should be used, where the automated identification of categories is done systematically using a method that includes historic energy use and energy savings potential of each category. In an embodiment, the operator can provide an ordering of the selected categories for use in display or reporting and apply unique display names and visual icons.

To ensure that the near real-time feedback and recent summaries of energy use are relevant to the work at hand and that there are recurring and realistic opportunities for operative workers to reduce energy consumption throughout the work day or process cycle, feedback is given in the context of discrete and non-overlapping time intervals. The business manager or operator may, in an embodiment, manually select in the software the time interval or select configurations in the software so that the software will automatically select or recommend the time interval, where the automated identification of time interval is done systematically using a method that includes business data such as industry type and product specific to that facility and operator team that has been surveyed from the business as well as archived energy use and supplemental and business data.

Within each time interval, the amount of feedback of under and over use (also referred to as positive and negative feedback, respectively) may be globally or independently set and managed for each category. The business manager or operator may, in an embodiment, manually select in the software the feedback levels to a global value or to specific values or select configurations in the software so that the software automatically selects the feedback levels. The automated selection is performed systematically based on business data such as industry type, product, work hours specific to that facility and operative team, archived energy use and/or supplemental and other business data.

In an embodiment, to provide the desired, configured feedback regarding under and over use of energy for a category within a given time interval, a budget is created where the budget for a category is defined so that it meets a specified probability p of the budget being exceeded in that time interval where p was specified by the operator as the amount of feedback indicative of over use. Alternatively, the budget may be defined so that it meets a specified probability 1-p of the budget being met in that time interval. In an embodiment, a budget is the mean, or average, amount of energy consumed by a category for a given period of time when p is set to be 0.5 (50% positive and 50% negative feedback). To avoid user fatigue due to excessive negative feedback, the operator may choose to use a smaller value of p such as 0.2 (20%).

Figure 5:
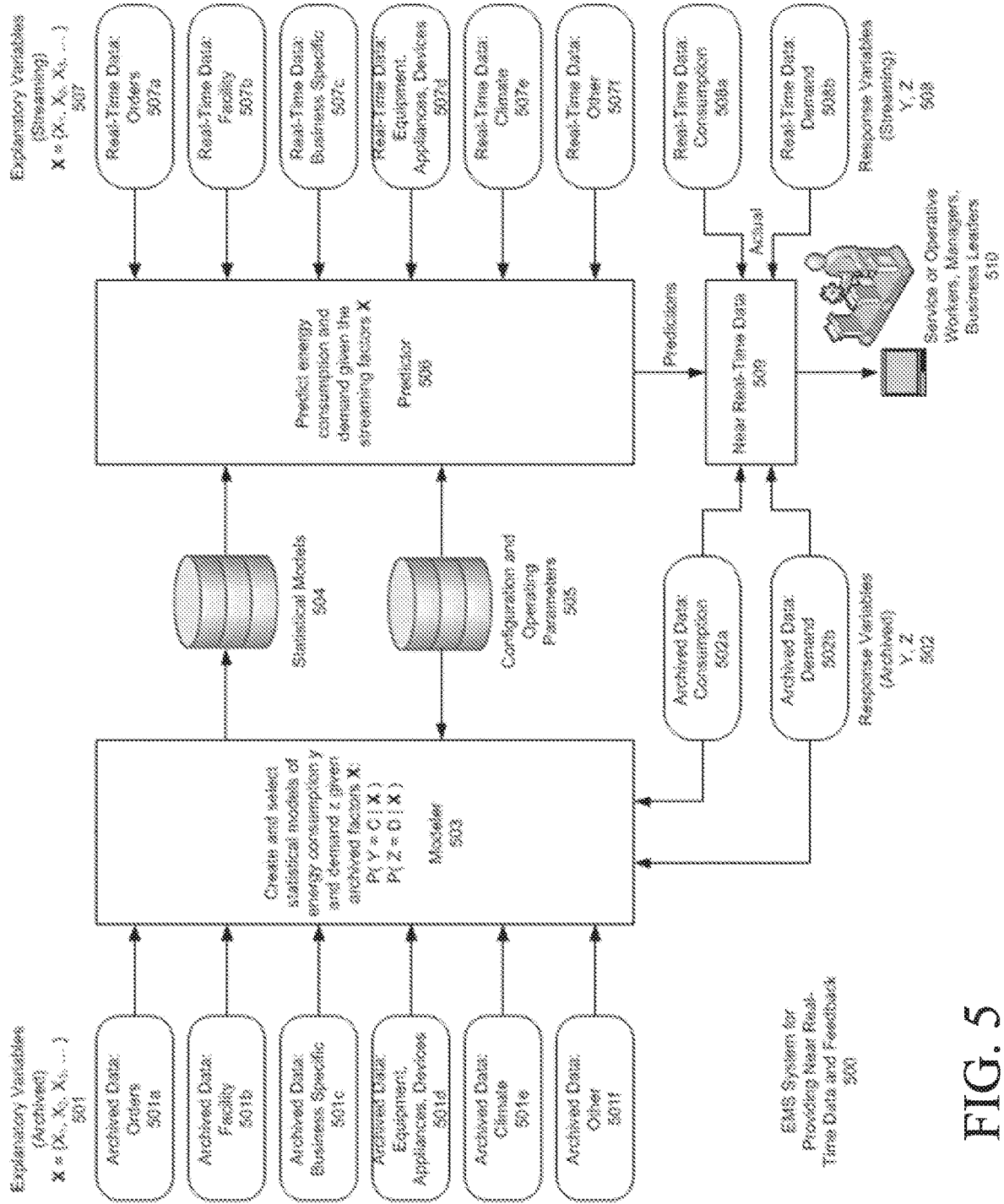
FIG. 5 is a block diagram illustrating a system for providing near real-time data for energy consumption management of appliances, devices, and equipment used in high-touch and on-demand services and operations.

FIG. 5 is an illustration showing a block diagram of a system for creating near real-time data and feedback 500 including creation of statistical models of energy consumption and demand, energy budgets, and visualizations and reports and other user interfaces for conveying near real time feedback. Available explanatory variables 501 and 507 and response variables 502 and 508 are identified and stored in the Configuration and Operating Parameters database 505. The Modeler 503 creates statistical models using archived explanatory variable data 501 and archived response variable data 502 and configuration and operating parameters 505 including category and time interval. The output of the Modeler 503 are stored in the Statistical Models database 504, where the output includes the model, the selected explanatory variables, parameters if the model is parametric, and other descriptors if the model is non-parametric. The Predictor 506 creates real time predictions of the response variables (energy demand and consumption) which include computations of budgets which are predictions of energy consumption, using real-time explanatory variable data 507, models from the Statistical Model database 504, and configuration and operating parameters including category, time interval, and feedback parameter p. The predictions and budgets are used, with archived data and real time data, to create near real time data 509 such as visualizations and reports and other user interfaces that are provided to the end user 510 who may be a service or operative employee, managers, or business leader.

In an embodiment of the Modeler 503 and Predictor 506, energy consumption for each category and interval pair is considered a random variable and the budget is derived from the probability distribution function used to model the random variable. Using archived energy demand and consumption data, business data, and other related data, statistical modeling is used to create inverse cumulative probability distribution functions (also known as quantile functions) for each random variable. Each budget is computed as the value b of the random variable such that the probability that the random variable will be less than or equal to b is 1-p. The underlying statistical models are updated, preferably continuously as the volume of archived data expands over time, to adapt to changes in the business and appliances, devices, and other equipment. In an embodiment, the choice of the underlying model depends on the data itself; when there is little archived data and hence few data samples, it is preferable to use non-parametric, empirical quantile functions such as those elaborated in Hyndman and Fan, "Sample Quantiles in Statistical Packages" *American Statistician,* 1996 and to recompute or update the quantile functions with each newly acquired data sample. Other embodiments for deriving energy budgets may use machine learning or other statistical techniques to predict or compute the budget that would be or should be used to achieve the desired levels of negative and positive feedback.

Once the predictions (budgets) are available, various user interfaces (seen, heard, or otherwise perceived) can be used to convey: near real-time feedback about the under and over use of energy by category and interval so that service and operative workers may make in-the-moment changes in their workflow to reduce energy consumption; summary data regarding energy consumption of categories for recent time intervals so that operative workers and managers may understand short term performance or impact within a shift or process cycle; a user experience that rewards and incents sustained energy savings behaviors; and richly detailed, historical reports by category or at the appliance, device, and equipment levels over various windows of time to help the business better manage delivery and operations.

In an embodiment, the operational worker accesses near real-time data interfaces in their work environment. What information is needed and how it is conveyed will depend on the work environment. It is crucial that data conveyed to operative workers are not over detailed and that the mode or manner of conveyance does not distract a worker from the task at hand. Various means can be provided to convey in near real-time energy over use for a given category. For example: if workers have line of sight to dashboard or kiosk types of displays, an embodiment is a gauge form of data visualization; if workers use visual displays forms of information in an out of the way area, an embodiment is a simple visual cue, such as a light, that turns on if energy is being over used; if workers rely on audio signals, an embodiment conveys an over-use message in an audible manner to prompt the workers to make changes such as turning off an appliance.

One function of near-real time visualizations of energy over and under consumption is to convey quickly and with minimal detail which category is consuming or is at risk of consuming too much energy. FIG. 6 shows two different embodiments of visualizations of near-real time energy consumption against budget 600, both of which use a gauge for each category where the real-time data are normalized to each budget to eliminate variations of magnitude across categories and where color overlays reinforce the current state of over consumption (e.g. yellow or red) and under consumption (e.g. green) as compared to predicted consumption.

The first visualization 601 uses a gas-tank like (depletion paradigm) gauge for each category with a given "fuel budget" for each time interval. At the beginning of each time interval, for example the beginning of each hour for hourly intervals, the gauge is reset to full (F) at the far right. Each gauge is continuously updated to show consumption as a function of budget depletion. In 601, the dial will move from full towards empty (right to left) over the time interval as energy is consumed. The gauges have color overlays intended as prompts to users to reduce energy use. In 601, assume that the time interval is one hour and the current time is half-way through the current hour: the gauge is green in 601*a* because energy consumption is at or below consumption expected against the given budget; the gauge is yellow in 601*b* because energy consumption is higher than expected against the given budget and steps should be taken now to get energy use back on track; and the gauge is red in 601*e* as energy consumption has exceeded the entire budget allocated for that hour.

The second visualization 602 uses an accumulation paradigm for the gauges for each category with a given budget "limit" for each time interval. At the beginning of each time interval, for example the beginning of each hour, the gauge is reset to 0% at the far left. Each gauge is continuously updated to show consumption as accumulation towards the limit. In 602, the dial will move from 0% towards 100% (left to right) over the time interval as energy is consumed. The gauges have color overlays intended as prompts to users to reduce energy use. In 602, assume that the time interval is one hour and the current time is half-way through the current hour: the gauge is green in 602*a* because energy consumption is at or below consumption expected against the given budget; the gauge is yellow in 602*b* because energy consumption is higher than expected against the given budget and steps should be taken now to get energy use back on track; and the gauge is red in 602*c* as energy consumption has exceeded the entire budget allocated for that hour.

The a priori probability that a budget is exceeded for a category in a given time period is p, where p is the very same control parameter set by the operator to create the budgets. The amount of yellow and red shown to the user is thus controlled by p. If users respond to the feedback and make changes to their work flow that reduce energy use, then in practice, then the users will be rewarded with more positive feedback (green) and less negative feedback (yellow and red).

One function of summary data visualizations of energy consumption for recent time intervals is to help operative workers and managers understand short term performance or impact within a shift or process cycle. The visualizations are intended to convey quickly and with minimal detail the aggregate over or under consumption of energy of a set of categories over recent intervals. In an embodiment, an operator can, configure the visualization to show I prior intervals over a fixed time period. For example, if the interval size is one hour, the operator may select a summary of all intervals during the past 24 hours or a summary of only the completed intervals within the current calendar day (I=24). In an embodiment the summary for the end state of one interval is conveyed with a simple color overlay and/or by magnitude or other cue. In an embodiment, there are N end states for the end of each time interval, where an end state is the number of budgets not exceeded at the end of the interval. The operator can configure each interval end state to have a specific color overlay or other cue. In an embodiment, the operator can configure the visualization to exclude the data from specific categories, such as Total Building or Main Load, as operative workers are unable to directly control or be responsible for the energy consumption of some categories but for which a near real-time gauge visualization provides data of interest. If the number of budgets being tracked in this visualization is B then the number of end states is N=B+1. In an embodiment, the operator can configure the visualization with overlays that delineate shifts or process cycles.

Figure 7:
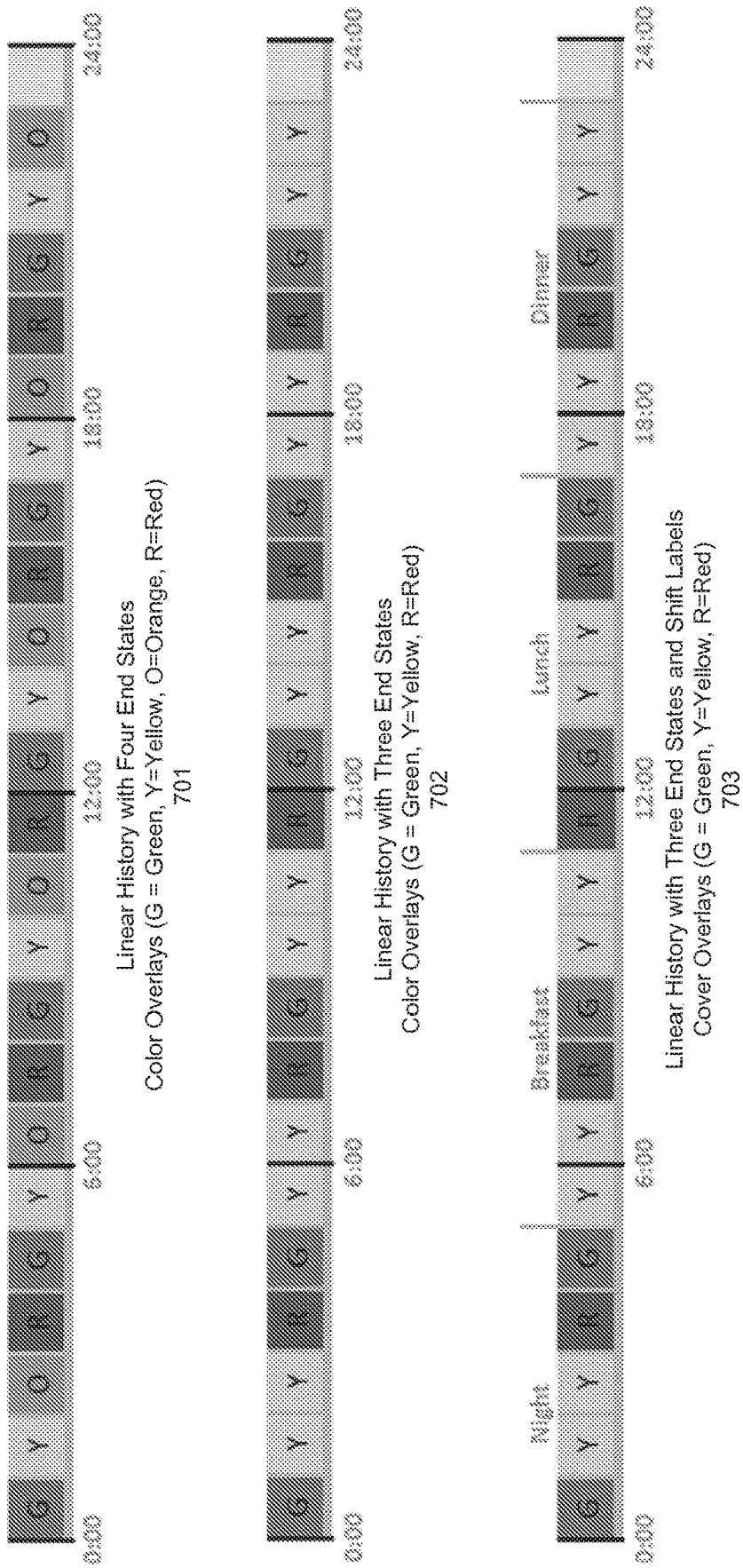
FIG. 7 and FIG. 8 contain screen shots illustrating various user interface visualizations of summaries of energy consumption for recent time intervals.
Figure 8:
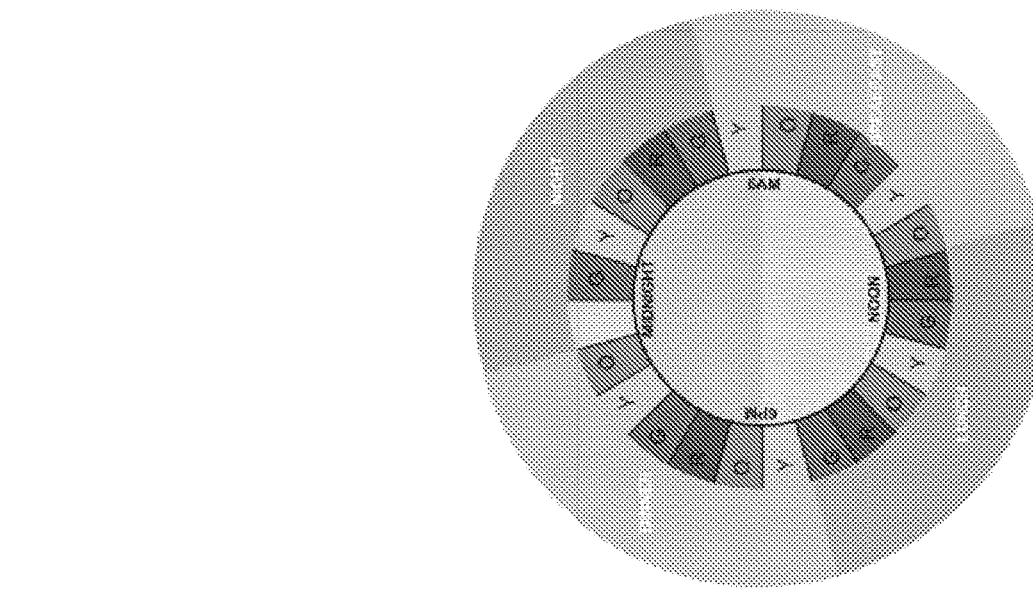

FIG. 7 and FIG. 8 show two different embodiments of visualizations, both of which use a colored tile for each past interval to represent the state of energy consumption against budget at the end of that interval. In both visualizations, the time interval is one hour, 24 hours of past data are displayed, and color only is used to convey state. Representations of state that vary in color and magnitude or in magnitude only are not shown. When data are not completely known (e.g. current interval or future intervals) or state is otherwise unknown, a background color is used for that tile.

In FIG. 7, linear visualizations are used to provide summaries of energy consumption for recent intervals. In 701 four colors are used to convey the ending state of one interval where the end state is the number of budgets that were not exceeded and there were three categories. If zero budgets were exceeded, then green is shown; if any one budget was exceeded then yellow is shown; if any two budgets were exceeded then orange is shown; if all budgets were exceeded then red is shown. In 702, three colors are used to convey the ending state of one interval where the end state is the number of budgets that were not exceeded and there were three categories. If zero budgets were exceeded, then green is shown; if any one budget was exceeded then yellow is shown; if any two budgets were exceeded then yellow is shown; if all budgets were exceeded then red is shown. In 703 an overlay of shifts is applied to 702 so that operative workers and line managers may better understand short term performance and impact within a shift or process cycle.

The embodiment shown in FIG. 8 conveys the data as a circular, or pie chart visualization where 801 represents the same data as 701, 802 represents the same data as 702, and in 803 and overlay of shifts is applied to 801 so that that operative workers and line managers may better understand short term performance and impact within a shift or process cycle. When data samples are not complete (e.g. current time interval or future intervals) or state is otherwise unknown, a background color is used for that slice.

The a priori probability that a budget is exceeded for a category in a given time period is p, where p is the very same control parameter set by the operator to create the budgets. The choice of the number of categories and number of colors or cues to use in the summaries of energy consumption for recent intervals has a direct impact on the variability of the feedback provided to the user. The probabilities of the states shown to the user are thus controlled by p and the number of categories and number of states. It is straightforward to compute the probability of a state given the number of categories, the number of states, and the probability p. An embodiment provides the operator information regarding what to expect in the visualization so that the operator can make informed decisions when configuring of the visualization for short term energy consumption use.

FIG. 9 shows tables of data that would be used to assist the operator in configuring color overlay visualizations of summaries of energy consumption for recent time intervals. In example 901, there are three categories and four end states (S1=green if all budgets are met for the three categories; S2=yellow if two budgets only are met for the three categories, S3=orange if one budget only is met for the three categories; and S4=red if zero budgets are met for the three categories). In an embodiment, the data provided to the user would include the probabilities of each of the four end states where the end state of each category is modeled as a Bernoulli random variable that is parameterized by the probability p of the budget being exceeded, and the three categories are assumed to be statistically independent. In this example the random variables are assumed to be statistically independent and identically distributed (iid). In example 902, there are three categories and three end states (S1=green if all budgets are met for the three categories; S2=yellow if one or two budgets are met for the three categories; and S3=red if zero budgets are met for the three categories). As in example 901, the table shows the probabilities of each of the three end states where the end state of each category are modeled as iid Bernoulli random variables that are parameterized by the probability p of the budget being exceeded.

If users respond to the feedback and make changes to their work flow that reduce energy use, then in practice, the users will be rewarded in the summary visualization with more positive feedback (more states where all budgets or all but one budgets were met) and less negative feedback (states where two or more budgets were not met).

To provide a user experience that rewards and incents sustained energy savings behaviors, an embodiment uses changing imagery on a dashboard to convey the cumulative impact of recent time intervals. FIG. 10 illustrates a method for selecting reward imagery based on recent past performance where recent past performance is based on the set, or subset, of the number of time intervals displayed in the summary of energy consumption for recent time intervals.

In an embodiment, the operator can configure the number K of most recent time intervals to be used in selecting and displaying imagery on a dashboard where the maximum number for K should be the maximum number I configured in the summary visualization. The state of each interval displayed in the summary of energy consumption is conveyed using a color overlay (or other cue). In an embodiment, a numerical value is associated with each state, 1000, in addition to the color associated with that state as used for the overlay in the summary. The numerical values represent the "goodness" of the end state. For example, in 1002, there are four end states S1-S4 for 3 categories where S1 is the state for no budgets exceeded, S2 is the state for one budget only was exceeded, S3 is the state for two budgets exceeded, and S4 is the state for all budgets exceeded. The states S1-S4 are sorted by "goodness" where the best state is S1 and the worst state is S4 and numerical values are assigned to the states in strictly decreasing order (or strictly increasing order) so that the best state has the highest value (or lowest value) and the worst state has the lowest value (or highest value).

In an embodiment, the operator configures the amount of imagery (number of levels M) to be displayed and the imagery itself. The range of levels that can be displayed can be determined systematically and suggested to the operator based on the settings of N and K. For the past K intervals, the values corresponding to each interval state are summed and normalized to a range of 0 to 1 to create ratio R. Scalar quantization methodology is used to systematically determine the bins associated with each level and the imagery to be displayed. As shown in 1001, the M bins are defined the range of the value R. Once a bin has been selected, the Award Level is designates the imagery to be displayed. The award level and imagery should be directly correlated to the overall goodness of the recent history. That is, if the interval state values are assigned so that the highest values are correlated to the highest "goodness" of a state, then the ratios with the highest values should correspond to the most rewarding imagery; if the interval state values are assigned so that the highest values are correlated to the least goodness of a state, then the ratios with the highest values should be correspond to the least rewarding imagery.

To walk through a complete example: in 1002, there are 3 budgets being tracked (B=3) and therefore four end states (N=4) where S1 is the state for no budgets exceeded, S2 is the state for one budget only was exceeded. S3 is the state for two budgets exceeded, and S4 is the state for all budgets exceeded. The states S1-S4 are sorted by "goodness" where the best state is S1 and the worst state is S4 and numerical values are assigned to the states in strictly decreasing order 3, 2, 1, 0 so that the best state has the highest value. In 1004, K=6 of the most recent time intervals are tracked. The values and colors for each of the six end states are taken from 1002. In 1005, the sum of the values in 1004 is 11 and the maximum possible value is 3*6=18. The normalized value R=0.61 is computed as the sum 11 divided by the maximum value 18. In 1003, bins for M=8 levels are specified where the bins are uniformly spaced (uniform scalar quantization is used to define the bins assuming R is uniformly distributed). The award levels would range from the least rewarding imagery assigned to the bin with the lowest ratios R to the most rewarding imagery assigned to the bin with the highest ratios R. The bin for R=0.61 in 1003 is Bin 4 as 0.61 is less than 0.625 and greater than or equal to 0.5. Therefore the award level is L4 and the imagery to be displayed should be 3 levels "degraded" from the best imagery associated with award level L7 and four levels "improved" from the worst imagery associated with award level L0. In practice, the distribution of R is not uniform, and an embodiment would use scalar quantization or adaptive scalar quantization methodologies to compute the bins to optimize the user experience so that all reward levels are conveyed and feedback given appropriately.

Figure 11:
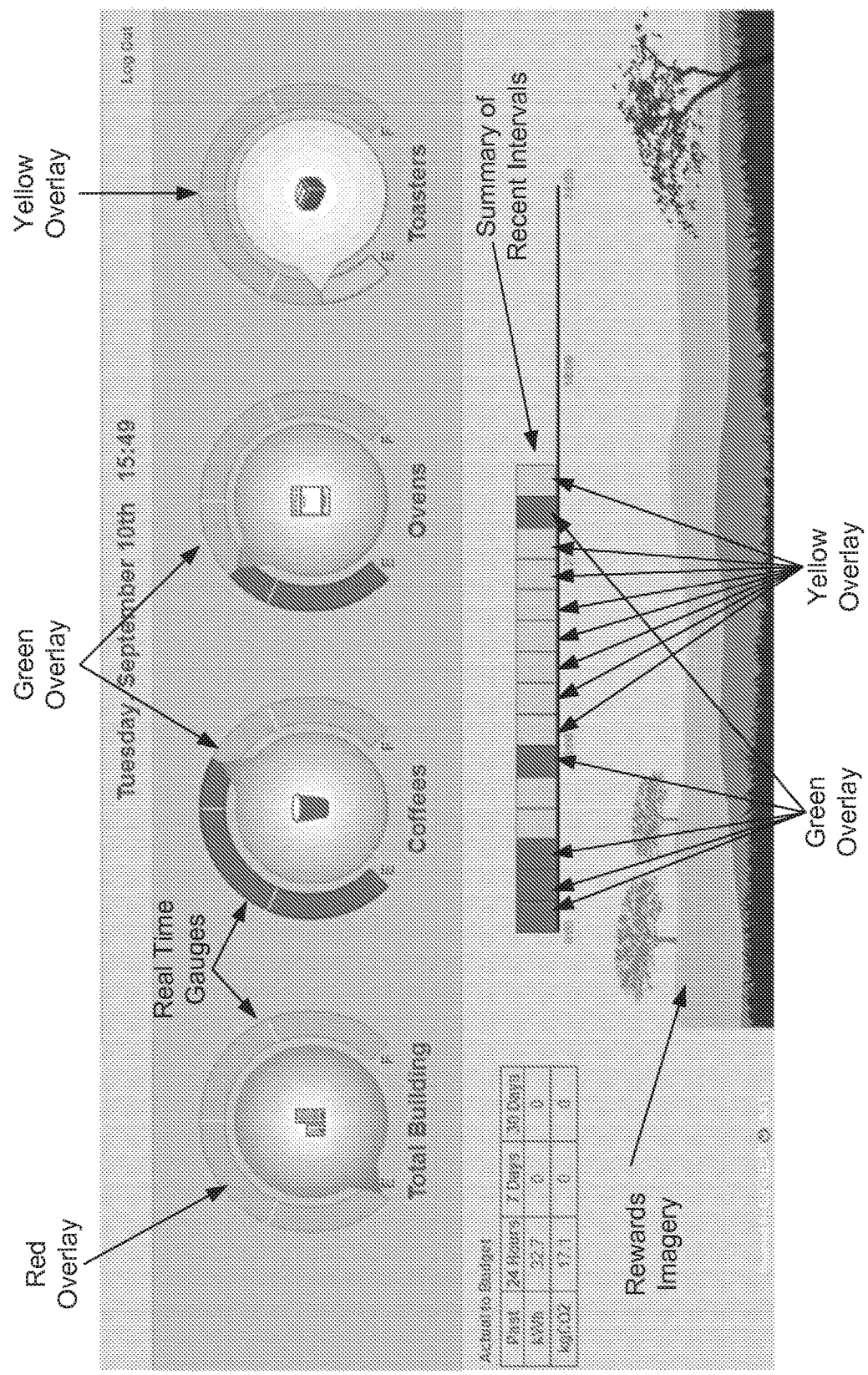
FIG. 11 contains an illustration of a user interface that incorporates near real-time visualizations of over and under use, visualizations of summaries of energy consumption for recent time intervals, and rewards imagery.

In FIG. 11, an embodiment with all of the visualization elements discussed above is illustrated where real-time gauges (depletion paradigm) with color overlays are given prominent display space for in the moment feedback, and summaries of recent time intervals and reward imagery are given secondary and tertiary placement shift related feedback.

To evaluate overall performance, shift and line managers and executives have access to reports by shift, day, and other periods as well as by organizational structure, to assess daily workflows and energy savings improvements via an advanced reporting user interface.

The present invention is described above with reference to block diagrams and operational illustrations of methods and devices for creating real time data for in-the-moment management of appliances, devices, and equipment used in a particular line of business. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although the present invention has been described in considerable detail with reference to certain preferred versions thereof, other versions are possible. Therefore, the spirit and scope of the appended claims should not be limited to the description of the preferred versions contained herein. The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

What is claimed is:

1. A computer-implemented method of controlling energy consumption at a facility having energy consuming equipment and an on-site human equipment operator capable of manually controlling the energy consumption of the equipment, the method comprising:
   sub-metering the equipment at the facility using one or more meters to produce time series data representing energy use during each time interval of a plurality of successive non-overlapping time intervals;
   transmitting the time series data to a data store;
   using one or more servers, repeatedly calculating, during and for each time interval, a total energy consumption of the equipment using the time series data;
   using the one or more servers, generating a statistical model of the total energy consumption of the equipment using the time series data and the calculated total energy consumption of the equipment during each time interval;
   automatically determining, using the one or more servers based on the generated statistical model and business data about the facility including one or more of an industry type of the facility, a product of the facility, or work hours of the facility, a desired probability P of the total energy consumption of the equipment exceeding an energy consumption prediction B;
   using the one or more servers and the generated statistical model, calculating the energy consumption prediction B of the equipment based on the automatically determined probability P such that that a probability that an actual energy consumption of the equipment will be less than or equal to the energy consumption prediction B is 1-P;
   using the one or more servers, repeatedly comparing, during and for each time interval, the total energy consumption of the equipment to the energy consumption prediction B to determine the progress made towards reaching the energy consumption prediction B for each time interval; and
   providing real-time feedback to the human equipment operator via a user interface at the facility, wherein the user interface indicates the progress made towards reaching the energy consumption prediction B within each time interval, and wherein the real time feedback transmitted by the user interface provides the human equipment operator with information that enables the human equipment operator to make real-time decisions about how to control the equipment in order to minimize energy consumption.

2. The method of claim 1, further comprising:
   creating multiple statistical models, each of the multiple statistical models corresponding to one of multiple consumption predictions B; and
   calculating the multiple consumption predictions B from their corresponding statistical models, wherein each of the multiple consumption predictions B corresponds to one or more items of the energy consuming equipment.

3. The method of claim 2, wherein each of the multiple consumption predictions B corresponds to an equipment category.

4. The method of claim 1, further comprising:
   creating the statistical model of energy consumption based on one or more archived explanatory variables, archived consumption data, or archived demand data, wherein the statistical model of energy consumption includes an inverse cumulative probability distribution function, and wherein the energy consumption prediction B is calculated by applying the probability P to the inverse cumulative probability distribution function.

5. The method of claim 4, further comprising:
   periodically recalculating the energy consumption prediction B to reflect changes of the one or more of explanatory variables, archived consumption data, or archived demand data.

6. The method of claim 1, further comprising:
   periodically updating the statistical model of energy consumption in order to adjust the energy consumption prediction B.

7. The method of claim 1, further comprising:
   updating the statistical model of energy consumption to include one or more changes in business operation or equipment.

8. The method of claim 1, further comprising:
   creating the statistical model of energy consumption based on a non-parametric empirical quantile function.

9. The method of claim 1, wherein the real-time feedback includes:
   displaying a graphical depletion gauge that indicates to the human equipment operator how much of the energy consumption prediction B remains with respect to the calculated energy consumption prediction B within each time interval.

10. The method of claim 9, wherein the real-time feedback includes:
repeatedly displaying a color code that is indicative of the total energy consumption of the equipment relative to the energy consumption prediction B during each time interval.

11. The method of claim 10, wherein the color code is superimposed over the graphical depletion gauge.

12. The method of claim 1, wherein the real-time feedback includes:
displaying a graphical accumulation gauge that indicates to the human equipment operator how much of the energy consumption prediction B has been consumed with respect to the calculated energy consumption prediction B.

13. The method of claim 12, wherein the real-time feedback includes:
repeatedly displaying a color code that is indicative of the total energy consumption of the equipment relative to the energy consumption prediction B during each time interval.

14. The method of claim 13, wherein the color code is superimposed over the graphical accumulation gauge.

15. The method of claim 1, wherein providing the real-time feedback includes:
generating an audible sound that indicates to the human equipment operator the total energy consumption of the equipment relative to the energy consumption prediction B during each time interval.

16. The method of claim 1, wherein multiple groups of the equipment are sub-metered, each group having its own energy consumption prediction B, further comprising:
determining, for each group of equipment, the number of groups that exceeded the corresponding energy consumption prediction B for each time interval; and
graphically displaying, on a time scale delineating each of multiple time intervals, an indicator of the number of equipment groups that exceeded the corresponding energy consumption prediction B during each time interval.

17. The method of claim 16, wherein the time scale includes shift labels.

18. The method of claim 1, wherein multiple groups of the equipment are sub-metered, each group having its own energy consumption prediction B, further comprising:
determining, for each group of equipment, the number of groups that met the corresponding energy consumption prediction B over a fixed number of previous time intervals; and
graphically displaying one of a plurality of images indicative of the number of groups of equipment that meet their corresponding consumption prediction B.

19. A computer program product for controlling energy consumption at a facility having energy consuming equipment and an on-site human equipment operator capable of manually controlling the energy consumption of the equipment, wherein the equipment at the facility is sub-metered to produce time series data representing energy use during each time interval of a plurality of successive non-overlapping time intervals, comprising:
a non-transitory computer usable medium having computer readable program code embodied in the computer usable medium for causing an application program to execute on a computer system, the computer readable program code comprising:
computer readable program code for repeatedly calculating, during and for each time interval, a total energy consumption of the equipment using the time series data;
computer readable program code for generating a statistical model of the total energy consumption of the equipment using the time series data and the calculated total energy consumption of the equipment during each time interval;
computer readable program code for automatically determining, based on the generated statistical model and business data about the facility including one or more of an industry type of the facility, a product of the facility, or work hours of the facility, a desired probability P of the total energy consumption of the equipment exceeding an energy consumption prediction B;
computer readable program code for calculating, using the generated statistical model, the energy consumption prediction B of the equipment based on the automatically determined probability P such that that a probability that an actual energy consumption of the equipment will be less than or equal to the energy consumption prediction B is 1-P;
computer readable program code for repeatedly comparing, during and for each time interval, the total energy consumption of the equipment to the energy consumption prediction B to determine the progress made towards reaching the energy consumption prediction B for each time interval; and
computer readable program code for providing real-time feedback to the human equipment operator at the facility that indicates the progress made towards reaching the energy consumption prediction B within each time interval, wherein the real time feedback provides the human equipment operator with information that enables the human equipment operator to make real-time decisions about how to control the equipment in order to minimize energy consumption.

20. A computer program product for controlling energy consumption at a facility having multiple categories of energy consuming equipment and an on-site human equipment operator capable of manually controlling the energy consumption of the equipment, wherein the multiple categories of equipment at the facility are sub-metered to produce time series data representing energy use during each time interval of a plurality of successive non-overlapping time intervals, comprising:
a non-transitory computer usable medium having computer readable program code embodied in the computer usable medium for causing an application program to execute on a computer system, the computer readable program code comprising:
computer readable program code for repeatedly calculating, during and for each time interval, a total energy consumption of each category of the equipment using the time series data;
computer readable program code for generating a statistical model of the total energy consumption of each category of the equipment using the time series data and the calculated total energy consumption of each category of the equipment during each time interval;
computer readable program code for automatically determining, based on the generated statistical model and business data about the facility including one or more of an industry type of the facility, a product of the facility, or work hours of the facility, a desired probability P of the total energy consumption of each category of the equipment exceeding an energy consumption prediction B;

computer readable program code for calculating, using the generated statistical model, for each of the multiple categories of equipment, the energy consumption prediction B for each equipment category based on the automatically determined probability P such that that a probability that an actual energy consumption of each category of the equipment will be less than or equal to the energy consumption prediction B is 1-P;

computer readable program code for comparing, during and for each time interval, the total energy consumption of each equipment category to the energy consumption prediction B for each equipment category to determine if the energy consumption prediction B for each category was exceeded for each time interval; and computer readable program code for providing real-time feedback to the human equipment operator at the facility that indicates the number of equipment category consumption predictions B that were met within each time interval, wherein the real time feedback provides the human equipment operator with information that enables the human equipment operator to make real-time decisions about how to control the equipment in order to minimize energy consumption.

* * * * *